United States Patent
Bahng et al.

(10) Patent No.: US 8,098,777 B2
(45) Date of Patent: Jan. 17, 2012

(54) SIGNAL DETECTION METHOD AND RECEIVING APPARATUS IN MIMO SYSTEM

(75) Inventors: Seung-Jae Bahng, Daejeon (KR); Young-Jo Bang, Daejeon (KR); Youn-Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 798 days.

(21) Appl. No.: 11/930,047

(22) Filed: Oct. 30, 2007

(65) Prior Publication Data
US 2008/0137782 A1 Jun. 12, 2008

(30) Foreign Application Priority Data

Dec. 6, 2006 (KR) .................. 10-2006-0122858

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........ 375/346; 375/260; 375/285; 375/340

(58) Field of Classification Search .......... 375/260, 375/267, 285, 340, 341, 346–347
See application file for complete search history.

(56) References Cited

U.S. PATENT DOCUMENTS

| | | | |
|---|---|---|---|
| 6,785,341 B2 * | 8/2004 | Walton et al. ................. | 375/267 |
| 7,194,041 B2 * | 3/2007 | Kadous ........................ | 375/267 |
| 7,302,009 B2 * | 11/2007 | Walton et al. ................ | 375/267 |
| 7,453,947 B2 * | 11/2008 | Kim et al. .................... | 375/267 |
| 7,496,148 B2 * | 2/2009 | Hwang et al. ................ | 375/267 |
| 7,583,763 B2 * | 9/2009 | Nissani (Nissensohn) ... | 375/341 |
| 7,702,050 B2 * | 4/2010 | Su ................................ | 375/347 |
| 7,876,848 B2 * | 1/2011 | Han et al. ..................... | 375/267 |
| 2005/0276362 A1 | 12/2005 | Yu et al. | |
| 2006/0029149 A1 | 2/2006 | Kim et al. | |

(Continued)

FOREIGN PATENT DOCUMENTS

KR  10-2005-0066633 A  6/2005

(Continued)

OTHER PUBLICATIONS

Jee Woong Kang and Kwang Bok (Ed) Lee, "Simplified ML detection scheme for MIMO systems", Vehicular Technology Conference, 2004, VTC 2004-Spring, 2004 IEEE 59th, pp. 824-827, May 2004.

*Primary Examiner* — Jean B Corrielus
(74) *Attorney, Agent, or Firm* — Jefferson IP Law, LLP

(57) ABSTRACT

The present invention relates to a signal detection method and a receiving apparatus in a multiple input multiple output (MIMO) system. More particularly, the present invention relates to a signal detection device in a MIMO system using a spatial multiplexing (SM) method. In the signal detection method, a channel is estimated and layers are rearranged according to a predetermined layer arrangement rule. QR-decomposition is performed by using a rearranged system model, all constellation points in a symbol of a layer having the lowest reliability are considered, and symbols are detected by using a sequential interference elimination method.

13 Claims, 5 Drawing Sheets

U.S. PATENT DOCUMENTS

| | | | |
|---|---|---|---|
| 2006/0146965 A1* | 7/2006 | Kwun et al. | 375/341 |
| 2006/0176971 A1* | 8/2006 | Nissani (Nissensohn) | 375/267 |
| 2007/0291866 A1* | 12/2007 | Rajappan et al. | 375/267 |
| 2008/0013638 A1* | 1/2008 | Walton et al. | 375/260 |
| 2008/0031372 A1* | 2/2008 | Walton et al. | 375/260 |
| 2008/0031374 A1* | 2/2008 | Walton et al. | 375/267 |

FOREIGN PATENT DOCUMENTS

| | | |
|---|---|---|
| KR | 1020060061508 A | 6/2006 |
| KR | 10-2007-0057616 A | 6/2007 |
| WO | 2004/023663 A1 | 3/2004 |
| WO | 2007/064131 A1 | 6/2007 |

* cited by examiner

FIG.3

```
Metric = big unmber
    for ι = 1 : C
        x₄ = Ω( ι )
        x₃ = slicing [ (y₃ −r₃₄x₄) / r₃₃ ]
        x₂ = slicing [ (y₂ −r₂₃x₃ −r₂₄x₄) / r₂₂ ]
        x₁ = slicing [ (y₁ −r₁₂x₂ −r₁₃x₃ −r₁₄x₄) / r₁₁ ]

Metric _t = ‖ y − Rx ‖²
if metric _t < metric
    x̂ = [ x₁  x₂  x₃  x₄ ]ᵀ
    metric = metric_t
  end
end
```

US 8,098,777 B2

SIGNAL DETECTION METHOD AND RECEIVING APPARATUS IN MIMO SYSTEM

CROSS-REFERENCE TO RELATED APPLICATION

This application claims priority to and the benefit of Korean Patent Application No. 10-2006-0122858 filed in the Korean Intellectual Property Office on Dec. 6, 2007, the entire contents of which are incorporated herein by reference.

BACKGROUND OF THE INVENTION (a) Field of the Invention

The present invention relates to a signal detection method and a receiving apparatus in a multiple input multiple output (MIMO) system. More particularly, the present invention relates to a signal detection device in a MIMO system using a spatial multiplexing (SM) method.

(b) Description of the Related Art

A fourth generation mobile communication-based wireless communication system requires high-speed data services for images and packets rather than services based on voice. Accordingly, a multiple input multiple output (MIMO) system is being spotlighted since the MIMO system uses a spatial multiplexing method in which high-rate data transmission can be performed by transmitting multiple data streams (here, each stream is also referred to as a "layer") to satisfy such a requirement. In the MIMO system using the spatial multiplexing method, transmitting antennas respectively transmit data layers including different pieces of information, and a receiving terminal separates the transmitted data layers. A conventional maximum likelihood (ML) signal detection method for detecting a transmission signal vector having ML metric values of available combinations of transmission signal vectors to detect a transmission signal has optimum performance. However, the conventional ML signal detection method may not be realized since complexity is problematically increased according to the number of transmitting antennas and the number of constellation points. Accordingly, a linear signal detection method reducing the complexity (e.g., a zero forcing (ZF) method and a minimum mean square estimator (MMSE) has been suggested, but performance thereof is deteriorated compared to the ML method. In addition, non-linear signal detection methods include an ordered successive interference cancellation (OSIC) method that is known as a vertical Bell Lab layered space time (VBLAST) method. The VBLAST method may be simply realized, and performance thereof is improved compared to the performance of the ZF and MMSE methods but is not greater than the ML method.

Associated technology relates to a signal detection method in a multiple transmitting/receiving antenna system using the spatial multiplexing method. To detect a signal in the MIMO system, a received signal is detected in a ZF method, and a first detection section is established from the detected signal. The received signal is detected in the ML method in the first detection section, and a second detection section is established from the signal detected in the ZF method and the signal detected in the ML method. The received signal is detected in the ML method in the second detection section, and a final value is established. Accordingly, while this conventional art has lower complexity than the ML method and higher performance than the ZF method and the MMSE method, it has lower performance than the ML method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a signal detection method for achieving performance that is close to that of the maximum likelihood (ML) method while having lower complexity than the ML method in a multiple input multiple output (MIMO) antenna system using a spatial multiplexing method, and a receiving apparatus.

According to an exemplary embodiment of the present invention, a receiving apparatus of a MIMO system includes a layer arrangement unit and a symbol detection unit. The layer arrangement unit rearranges channel estimated layers for a received signal based on reliability. The symbol detection unit detects a transmission symbol vector according to the layers that are rearranged by the layer arrangement unit.

According to another exemplary embodiment of the present invention, in a receiving method of a multiple input multiple output (MIMO) system, a) channel estimated layers for a received signal are rearranged based on reliability, b) a rearranged channel matrix H is QR-decomposed, and c) all constellation points for a symbol of a layer having the lowest reliability among the layers are considered, and the symbols are detected by using a sequential interference elimination method.

BRIEF DESCRIPTION OF THE DRAWINGS

FIG. 3 is a diagram representing an operational algorithm of a symbol detection unit in the MIMO system according to the exemplary embodiment of the present invention.

DETAILED DESCRIPTION OF THE EMBODIMENTS

Figure 1:
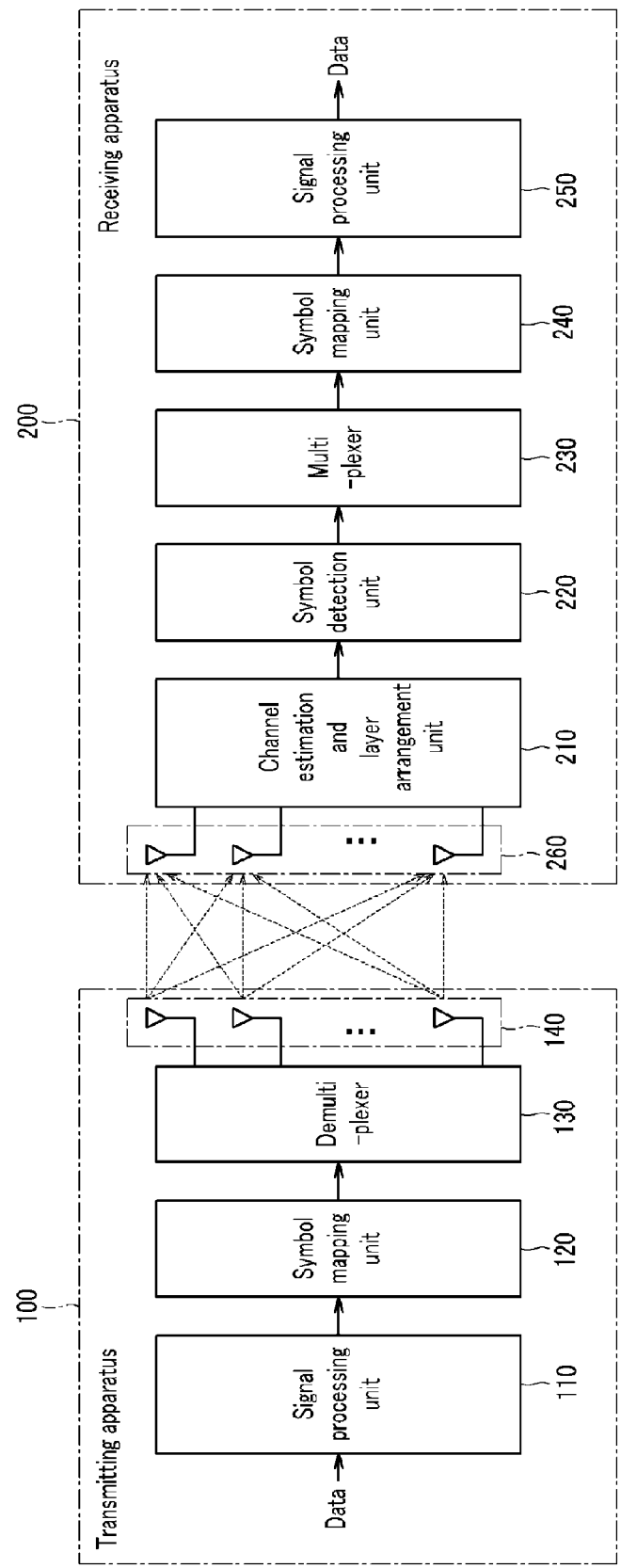
FIG. 1 is a schematic block diagram of a multiple input multiple output (MIMO) system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A transmission signal transmitted through a plurality of transmitting antennas is received in a multiple input multiple output (MIMO) system through a channel and a plurality of receiving antennas. For convenience of description, while it is assumed that four transmitting antennas and four receiving antennas are provided according to an exemplary embodiment of the present invention, it is not limited thereto.

FIG. 1 is a schematic block diagram of the MIMO system according to the exemplary embodiment of the present invention.

As shown in FIG. 1, the MIMO system includes a transmitting apparatus 100 and a receiving apparatus 200. The transmitting apparatus 100 includes a signal processing unit 110 for processing interleaving and channel encoding operations, a symbol mapping unit 120, a demultiplexer 130, and four transmitting antennas 140, and the receiving apparatus 200 includes a channel estimation and layer arrangement unit 210, a symbol detection unit 220, a multiplexer 230, a symbol demapping unit 240, a signal processing unit 250, and four receiving antennas 260.

In the transmitting apparatus 100, the signal processing unit 110 performs transmission data processes including scrambling, error correction coding, and interleaving processes, and transmits processed data to the symbol mapping unit 120. The transmission data transmitted to the signal processing unit 110 is binary data transmitted to a physical layer in a medium access control (MAC). The symbol mapping unit 120 converts the transmission data processed by the signal processing unit 110 to a symbol according to a modulation method. The symbols at high speed are divided to four low speed data layers through the demultiplexer 130 according to the number of transmitting antennas 140, and the four data layers are simultaneously transmitted through the transmitting antennas 140.

A signal transmitted to the receiving apparatus 200 through a channel is to received in parallel in the receiving apparatus 200 through the receiving antenna 260, and transmitted to the channel estimation and layer arrangement unit 210 to estimate a MIMO channel and rearrange layers. When the layers are rearranged, a layer having the lowest reliability is arranged as a last layer, and remaining layers are arranged in order of a layer having the second lowest reliability to a layer having the highest reliability.

That is, the layer having the lowest reliability is arranged as the last layer, the layer having the highest reliability is arranged as a third layer, and layers having the next highest reliabilities are arranged as second and first layers. The reliability of layers is determined based on a signal-to-noise ratio (SNR). The symbol detection unit 220 determines a transmission symbol by using channel information received from a previous block and the rearranged signal. Subsequently, data are received through the multiplexer 230, the symbol demapping unit 240, and the signal processing unit 250 that respectively perform opposite functions of the signal processing unit 110, the symbol mapping unit 120, and the demultiplexer 130 of the transmitting apparatus 100.

Figure 2:
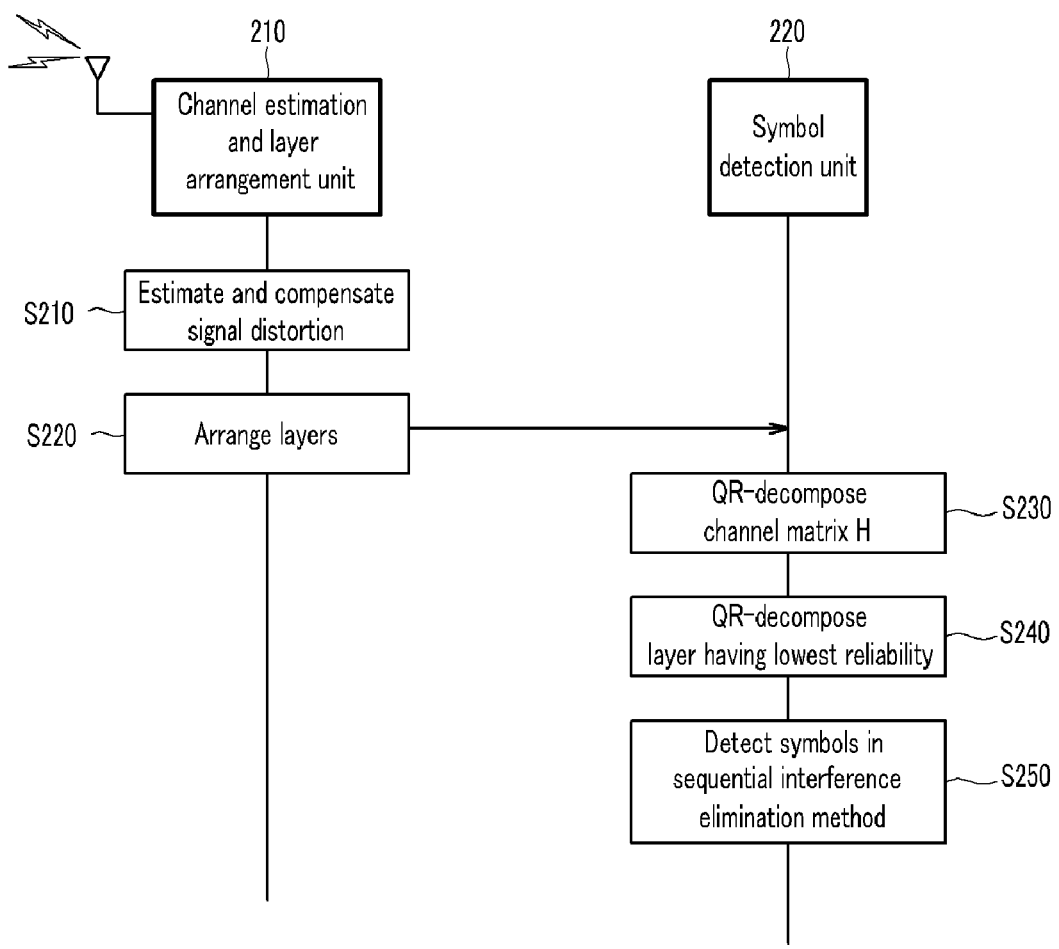
FIG. 2 is a flowchart representing a method for detecting a signal in the MIMO system according to the exemplary embodiment of the present invention.

FIG. 2 is a flowchart representing a method for detecting a signal in the MIMO system according to the exemplary embodiment of the present invention.

As shown in FIG. 2, a signal is received in the receiving apparatus 200 through the receiving antenna 260, and it is transmitted to the channel estimation and layer arrangement unit 210.

The channel estimation and layer arrangement unit 210 estimates and compensates signal distortion caused by multipath fading of a MIMO channel in step S210. In addition, the channel estimation and layer arrangement unit 210 arranges layers in step S220. In this case, when the layers are arranged, a layer having the lowest reliability is arranged as a last layer, and remaining layers are arranged in order from a layer having lower reliability to a layer having higher reliability. When $\tilde{H}$ denotes a MIMO channel before rearrangement, a matrix G may be obtained by calculating an inverse matrix as given as Equation 1.

$$G \to \tilde{H}^{-1} \quad \text{(Equation 1)}$$

Here, each row norm value of the matrix G is calculated, layers are arranged in order of a layer having the highest value as $x_4$, a layer having the lowest value as $x_3$, and layers having second and third lowest values as $x_2$ and $x_1$. A system model after the rearrangement is assumed to be the same as Equation 2.

$$\tilde{y} = Hx + \tilde{n} \quad \text{(Equation 2)}$$

Here, $\tilde{y}=[\tilde{y}_1\ \tilde{y}_2\ \tilde{y}_3\ \tilde{y}_4]^T$ denotes a received signal, $x=[x_1\ x_2\ x_3\ x_4]^T$ denotes a rearranged transmission signal, $\tilde{n}=[\tilde{n}_1\ \tilde{n}_2\ \tilde{n}_3\ \tilde{n}_4]^T$ denotes noise, and $H=[h_1\ h_2\ h_3\ h_4]^T$ denotes a 4×4 estimated channel matrix after the rearrangement. Accordingly, $x_4$ denotes a symbol of the layer having the lowest SNR, $x_3$ denotes a symbol of the layer having the highest SNR, $x_2$ denotes a symbol of the layer having the second highest SNR, and $x_2$ denotes a symbol of the layer having the third highest SNR. The layers are rearranged by the channel estimation and layer arrangement unit 210 to consider all possible constellation points for the layer that is least reliable (i.e., $x_4$) when the symbol detection unit 220 detects the symbol.

The symbol detection unit 220 QR-decomposes the rearranged channel matrix H as shown in Equation 3 in step S230.

$$H = QR \quad \text{(Equation 3)}$$

$$= Q \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}$$

Here, Q denotes an orthogonal matrix, and R denotes an upper triangular matrix in which upper elements including diagonal elements have values. In addition, y denotes a signal obtained by applying a matrix QH to the received signal as shown in Equation 4.

$$y = Q^H \tilde{y} \quad \text{(Equation 4)}$$

The symbol detection unit 220 considers all constellation points for the symbol $x_4$ of the layer having the lowest reliability in step S240, and detects the symbol in a sequential interference elimination method by using characteristics of an R matrix in step S250. The symbol detection unit 220 may detect a symbol by using the sequential symbol elimination method after the layer having the lowest reliability. That is, the symbol detection unit 220 may detect a symbol by performing sequential symbol elimination for the remaining layers. For example, with respect to $x_4$, $x_3$ is given as Equation 5.

$$x_3 = \text{slicing}\left(\frac{y_3 - r_{34}x_4}{r_{33}}\right) \quad \text{(Equation 5)}$$

Accordingly, $x_2$ and $x_1$ are determined as Equation 6 and Equation 7. Here, a slicing operation is a mapping operation to closest constellation points.

$$x_2 = \text{slicing}\left(\frac{y_2 - r_{23}x_3 - r_{24}x_4}{r_{22}}\right) \quad \text{(Equation 6)}$$

$$x_1 = \text{slicing}\left(\frac{y_1 - r_{12}x_2 - r_{13}x_3 - r_{14}x_4}{r_{11}}\right) \quad \text{(Equation 7)}$$

When the above operation is performed for all the constellation points of $x_4$, symbol vectors corresponding to a number C of final constellation points are obtained, and maximum likelihood (ML) metrics given as Equation 8 are applied to respective symbol vectors.

$$\arg\min\|y-Rx\|^2 \qquad \text{(Equation 8)}$$

Accordingly, a symbol vector having the lowest ML metric is detected as a final transmission symbol vector. An operational algorithm of the symbol detection unit 220 is shown in FIG. 3.

Figure 4:
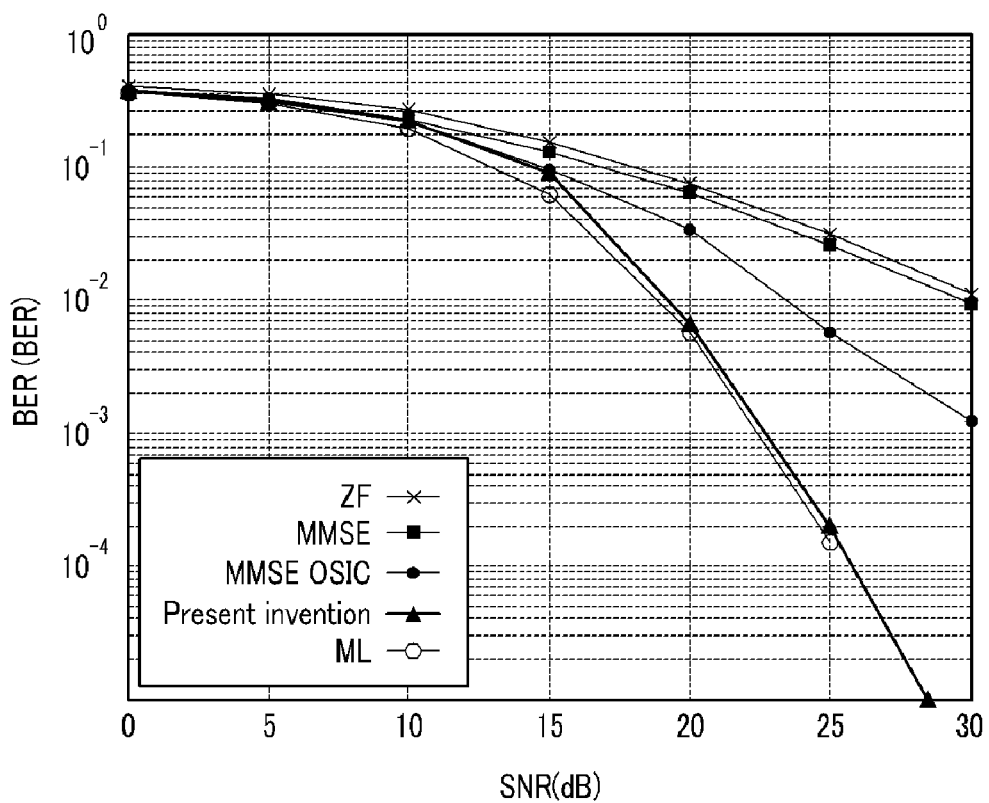
FIG. 4 shows a diagram representing bit error rates according to signal detection methods when four transmitting antennas, four receiving antennas, and a 16-quadrature amplitude modulation (QAM) method are used.
Figure 5:
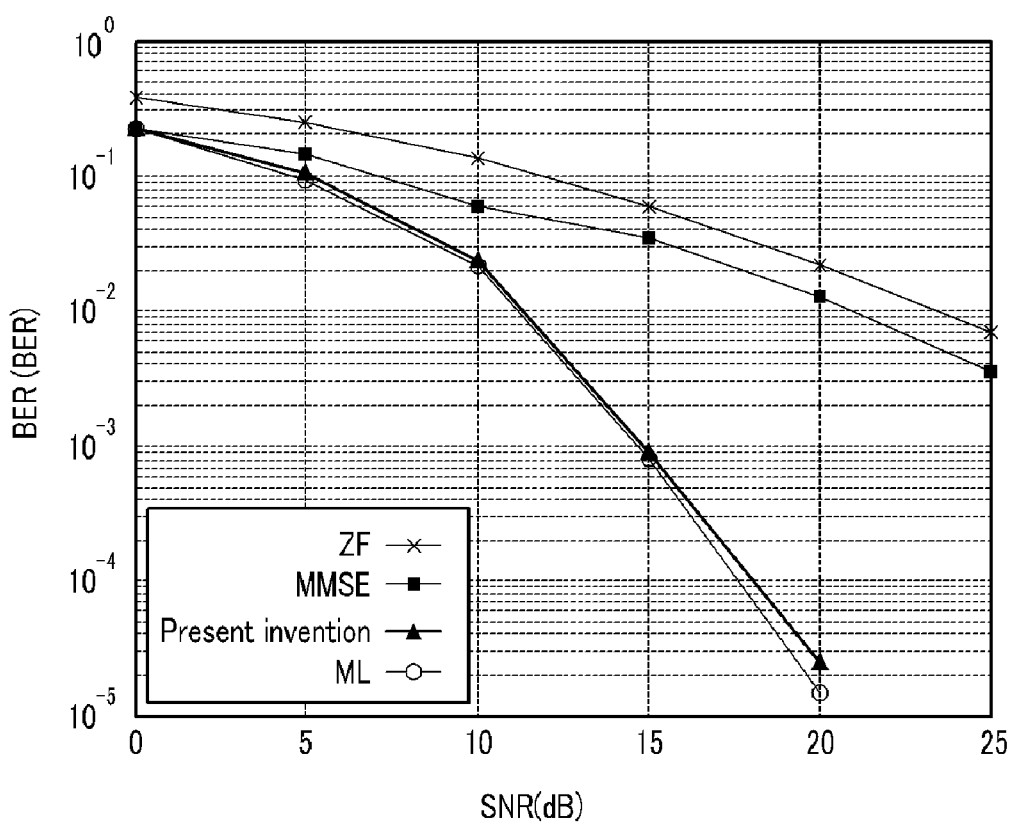
FIG. 5 shows a diagram representing bit error rates according to the signal detection methods when four transmitting antennas, four receiving antennas, and a quadrature phase shift keying (QPSK) modulation method are used.

FIG. 4 and FIG. 5 are respectively graphs representing simulation results comparing a detection method according to the exemplary embodiment of the present invention and an ML detection method.

In FIG. 4, bit error rates according to signal detection methods are shown when four transmitting antennas, four receiving antennas, and a 16-quadrature amplitude modulation (QAM) method are used.

As shown in FIG. 4, the signal detection method according to the exemplary embodiment of the present invention reaches closely to the performance of the ML detection method. In addition, when complexity of the ML detection method and complexity according to the exemplary embodiment of the present invention are calculated with respect to a real number multiplier, it is required to provide 525312 real number multipliers in the ML detection method while it is only required to provide 1368 real number multipliers in the detection method according to the exemplary embodiment of the present invention. Accordingly, the signal detection method according to the exemplary embodiment of the present invention has 0.26% of the complexity of the ML detection method.

FIG. 5 shows bit error rates according to signal detection methods when four transmitting antennas, four receiving antennas, and a quadrature phase shift keying (QPSK) modulation method are used.

As shown in FIG. 5, the signal detection method according to the exemplary embodiment of the present invention reaches closely to the performance of the ML detection method. Accordingly, when the signal detection method according to the exemplary embodiment of the present invention is applied to the MIMO system using a spatial multiplexing method, the complexity is lower than the ML detection method and the performance is close to that of the ML detection method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, without performing an exhaustive full search operation of the ML detection method that is know as an optimum detection method, performance that is close to that of the ML detection method may be achieved. That is, performance that is close to that of the ML detection method is achieved and the number of required calculations is reduced, and therefore it is easy to realize hardware.

What is claimed is:

1. A receiving apparatus of a multiple input multiple output (MIMO) system, the receiving apparatus comprising:
   a layer arrangement unit for rearranging channel estimated layers for a received signal based on reliability of the each of the layers, wherein the reliability of each of the layers is determined based on a reception quality of each of the layers; and
   a symbol detection unit for detecting a transmission symbol vector according to the layers that are rearranged by the layer arrangement unit, wherein the symbol detection unit detects the transmission symbol vector according to the layers rearranged by the layer arrangement unit by:
   QR-decomposing a channel matrix H rearranged after the layer arrangement unit rearranges the channel estimated layers for the received signal, based on the reliability of the each of the layers;
   considering all constellation points for a symbol of a layer having a lowest reliability among the layers rearranged after the layer arrangement unit rearranges the channel estimated layers for the received signal based on the reliability of the each of the layers, based on signals obtained by applying a matrix QH to the received signal; and
   detecting the symbol by performing sequential interference elimination.

2. The receiving apparatus of claim 1, wherein the reception quality of each of the layers is determined based on a signal-to-noise ratio (SNR) of each of the layers when the layer arrangement unit rearranges the layers.

3. The receiving apparatus of claim 1, wherein the layer arrangement unit arranges the layer having the lowest reliability as a last layer, and remaining layers are arranged in order of a layer having a second lowest reliability to a layer having a highest reliability.

4. The receiving apparatus of claim 3, wherein the symbol detection unit detects a symbol by performing sequential symbol elimination for the remaining layers.

5. A receiving method of a multiple input multiple output (MIMO) system, the receiving method comprising:
   a) rearranging channel estimated layers for a received signal based on reliability of the each of the layers, wherein the reliability of each of the layers is determined based on a reception quality of each of the layers; and
   b) detecting a transmission symbol vector according to the layers rearranged by a layer arrangement unit, wherein the detecting of the transmission symbol vector according to the layers rearranged by the layer arrangement unit comprises:
   b-1) QR-decomposing a channel matrix H rearranged after a); and
   b-2) considering all constellation points for a symbol of a layer having a lowest reliability among the layers rearranged after a) based on signals obtained by applying a matrix QH to the received signal, and detecting the symbol by performing sequential interference elimination.

6. The receiving method of claim 5, wherein, in a), a channel estimation unit estimates and compensates a signal distortion caused by multipath fading of a transmission channel with respect to the received signal.

7. The receiving method of claim 5, wherein, in a), the layer having the lowest reliability is arranged as a last layer, and remaining layers are arranged in order from a layer having a second lowest reliability to a layer having a highest reliability.

8. The receiving method of claim 7, wherein a) comprises:
   a-1) calculating an inverse matrix G to represent a channel characteristic of the received signal by using an equation:

$$G=\tilde{H}^{-1},$$

where $\tilde{H}$ denotes a MIMO channel before rearrangement.

9. The receiving method of claim 8, wherein a) further comprises:

a-2) arranging and considering all constellation points of the layer having the lowest reliability by using an equation:

$$\tilde{y} = Hx + \tilde{n},$$

where $\tilde{y} = [\tilde{y}_1\ \tilde{y}_2\ \tilde{y}_3\ \tilde{y}_4]^T$ denotes a received signal, $x = [x_1\ x_2\ x_3\ x_4]^T$ denotes a rearranged transmission signal, $\tilde{n} = [\tilde{n}_1\ \tilde{n}_2\ \tilde{n}_3\ \tilde{n}_4]^T$ denotes noise, and $H = [h_1\ h_2\ h_3\ h_4]^T$ denotes a 4×4 estimated channel matrix after the rearrangement, wherein the rearranged signals are arranged in order of $x_4$, a symbol of the layer having the lowest reliability, $x_3$, a symbol of the layer having the highest reliability, $x_2$, a symbol of the layer having the second highest reliability, and $x_1$, a symbol of the layer having the third highest reliability, based on a signal-to-noise ratio (SNR).

10. The receiving method of claim 5, wherein, in b-1), the rearranged channel matrix H is QR-decomposed by using an equation:

$$H = QR = Q \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix},$$

wherein Q denotes an orthogonal matrix, and R denotes an upper triangular matrix in which upper elements including diagonal elements have non-zero values.

11. The receiving method of claim 10, wherein, in b-2), when performing sequential interference elimination, symbols are sequentially detected by using characteristics of an R matrix with respect to the symbol of the layer having the lowest reliability.

12. The receiving method of claim 11, wherein, when $x = [x_1\ x_2\ x_3\ x_4]^T$ denotes a rearranged signal received from the layer arrangement unit, a mapping to closest constellation points is determined, with respect to a symbol $x_4$ of the layer having the lowest reliability, by using equations:

$$x_3 = \text{slicing}\left(\frac{y_3 - r_{34}x_4}{r_{33}}\right),$$

$$x_2 = \text{slicing}\left(\frac{y_2 - r_{23}x_3 - r_{24}x_4}{r_{22}}\right), \text{ and}$$

$$x_1 = \text{slicing}\left(\frac{y_1 - r_{12}x_2 - r_{13}x_3 - r_{14}x_4}{r_{11}}\right)$$

wherein $y_1$, $y_2$ and $y_3$ are received signals.

13. The receiving method of claim 10, wherein a symbol vector having a least maximum likelihood (ML) metric is detected as a final transmission vector from symbol vectors corresponding to the number of constellation points by using an equation:

$$\arg\min \|y - Rx\|^2,$$

wherein y is a received signal, R is an upper triangular matrix and x is a rearranged transmission signal.

* * * * *